US008165606B2

(12) United States Patent
Dunn et al.

(10) Patent No.: US 8,165,606 B2
(45) Date of Patent: Apr. 24, 2012

(54) APPARATUS, SYSTEM, AND METHOD FOR LOCATION INFORMATION MANAGEMENT IN A PORTABLE COMMUNICATION DEVICE

(75) Inventors: Doug Dunn, Chula Vista, CA (US); Amit Kalhan, La Jolla, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1054 days.

(21) Appl. No.: 11/317,406

(22) Filed: Dec. 22, 2005

(65) Prior Publication Data

US 2007/0149211 A1 Jun. 28, 2007

(51) Int. Cl.
 *H04W 24/00* (2009.01)
(52) U.S. Cl. ............... 455/456.6; 455/456.1; 455/435.2; 455/404.1; 455/404.2; 455/41.2; 370/401; 701/207; 701/213
(58) Field of Classification Search ............... 455/456.1, 455/435.2, 456.6, 404.1, 404.2, 41.2; 701/207, 701/213; 370/401
See application file for complete search history.

(56) References Cited

U.S. PATENT DOCUMENTS

| | | | |
|---|---|---|---|
| 6,298,229 B1 | 10/2001 | Tomlinson, Jr. et al. | |
| 6,493,629 B1 * | 12/2002 | Van Bosch | 701/207 |
| 6,665,611 B1 | 12/2003 | Oran et al. | |
| 6,799,049 B1 | 9/2004 | Zellner et al. | |
| 6,810,323 B1 | 10/2004 | Bullock et al. | |
| 2002/0111171 A1 | 8/2002 | Boesch et al. | |
| 2004/0033795 A1 * | 2/2004 | Walsh et al. | 455/404.1 |
| 2004/0157625 A1 | 8/2004 | Gheorghiu et al. | |
| 2004/0239498 A1 * | 12/2004 | Miller | 340/539.13 |
| 2004/0259546 A1 * | 12/2004 | Balachandran et al. | 455/435.2 |
| 2005/0037775 A1 * | 2/2005 | Moeglein et al. | 455/456.1 |
| 2005/0085257 A1 | 4/2005 | Laird et al. | |
| 2005/0181805 A1 | 8/2005 | Gallagher | |
| 2005/0186967 A1 | 8/2005 | Ozluturk | |

FOREIGN PATENT DOCUMENTS

| | | |
|---|---|---|
| EP | 1349413 | 10/2003 |
| EP | 1580569 | 9/2005 |
| JP | 2004-532576 A1 | 10/2004 |
| JP | 2005-79844 A1 | 3/2005 |
| WO | WO 03/081939 | 10/2003 |
| WO | WO2004/032561 A2 | 4/2004 |
| WO | WO2004/032561 A3 | 4/2004 |
| WO | WO2005/112488 A2 | 11/2005 |
| WO | WO2005/112488 A3 | 11/2005 |

* cited by examiner

*Primary Examiner* — Dwayne Bost
*Assistant Examiner* — Amancio Gonzalez

(57) ABSTRACT

An apparatus, system, and method for managing geographical location information of a portable communication device by determining and storing the geographic location information while registered on a cellular communication system in response to detecting an available wireless local area network (WLAN) system. When the portable communication device is communicating on the cellular communication system and a WLAN access point is detected, a location determination procedure is performed and the resulting geographical location information is stored at the portable communication device. When the portable communication device is communicating with a wireless access point of a WLAN system, and a second access point is detected, the portable communication device registers to the cellular communication network, if not already registered, and performs the geographical location determination procedure. Geographical location information is transmitted to a public safety answering point (PSAP) or network entity when an emergency call is executed.

15 Claims, 5 Drawing Sheets

APPARATUS, SYSTEM, AND METHOD FOR LOCATION INFORMATION MANAGEMENT IN A PORTABLE COMMUNICATION DEVICE

FIELD OF THE INVENTION

The invention relates in general to wireless communication systems and more specifically to an apparatus, system, and method for managing location information in a portable communication device.

BACKGROUND OF THE INVENTION

The Federal Communications Commission (FCC) 911 mandates require a mechanism to provide the location of a 9-1-1 caller to the emergency services dispatcher. In landline telephone service, the location of the caller is determined based on the telephone number of the calling device. After the caller places an emergency call by dialing 9-1-1, a public safety answering point (PSAP) determines the location of the caller based on the physical address associated with the calling number. Since portable communication devices such as cellular handsets are not associated with a physical address, other techniques must be employed to determine the geographical location of the caller. These other techniques can be divided into two general categories, network based and handset based. Examples of network based techniques for determining a location of a cellular handset include Time of Arrival (TOA), Angle of Arrival (AOA), and Received Signal strength (RSS) techniques. Examples of handset based techniques for determining the geographical location of the handset include utilize Global Positioning Satellite (GPS), Assisted GPS (AGPS) and Advanced Forward Link Trilateration (AFLT).

Multimode portable communication devices are capable of operating within a cellular telecommunications system as well as wireless local area network (WLAN) systems. Multimode portable communication devices are capable of voice communications over cellular and WLAN systems. When operating in a WLAN system, voice over internet (VoIP) services are utilized for voice communications. WLAN systems typically employ smaller communication areas as compared to cellular systems. When communicating within the WLAN system however, the geographical location information of the portable communication device is either unavailable or unreliable. WLAN systems are typically deployed within buildings or in areas where cellular coverage and/or GPS coverage may be otherwise limited. Accordingly, when the portable communication device switches to a WLAN system, geographical location information may not be available for emergency personnel.

Therefore, there is a need for an apparatus, system, and method for managing geographical location information at a portable communication device.

SUMMARY OF THE INVENTION

In response to detecting an available alternate wireless system, geographic location information of a portable communication device is determined while the portable communication device is registered on a cellular communication system. The geographic location information is stored at the portable communication device and used during a location based service (LBS) procedure.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention.

DETAILED DESCRIPTION

An apparatus, system, and method manage geographical location information of a portable communication device by determining and storing the geographic location information while registered on a cellular communication system in response to detecting an available wireless local area network (WLAN) access point providing a WLAN coverage area. When the portable communication device is communicating on the cellular communication system and the WLAN access point is detected, a location determination procedure is performed and the resulting geographical location information is stored at the portable communication device. When the portable communication device is communicating with a wireless access point of a WLAN system, and a second access point is detected, the portable communication device acquires a cellular communication channel of the cellular communication network and performs the location determination procedure. Geographical location information is transmitted to a public safety answering point (PSAP) or network entity when an emergency call is executed. Accordingly, a dual mode portable communication device that is operational in a cellular communication system and VoIP networks can provide information to the PSAP that at least corresponds to the last geographical location determined while communicating in the cellular communication system.

Figure 1:
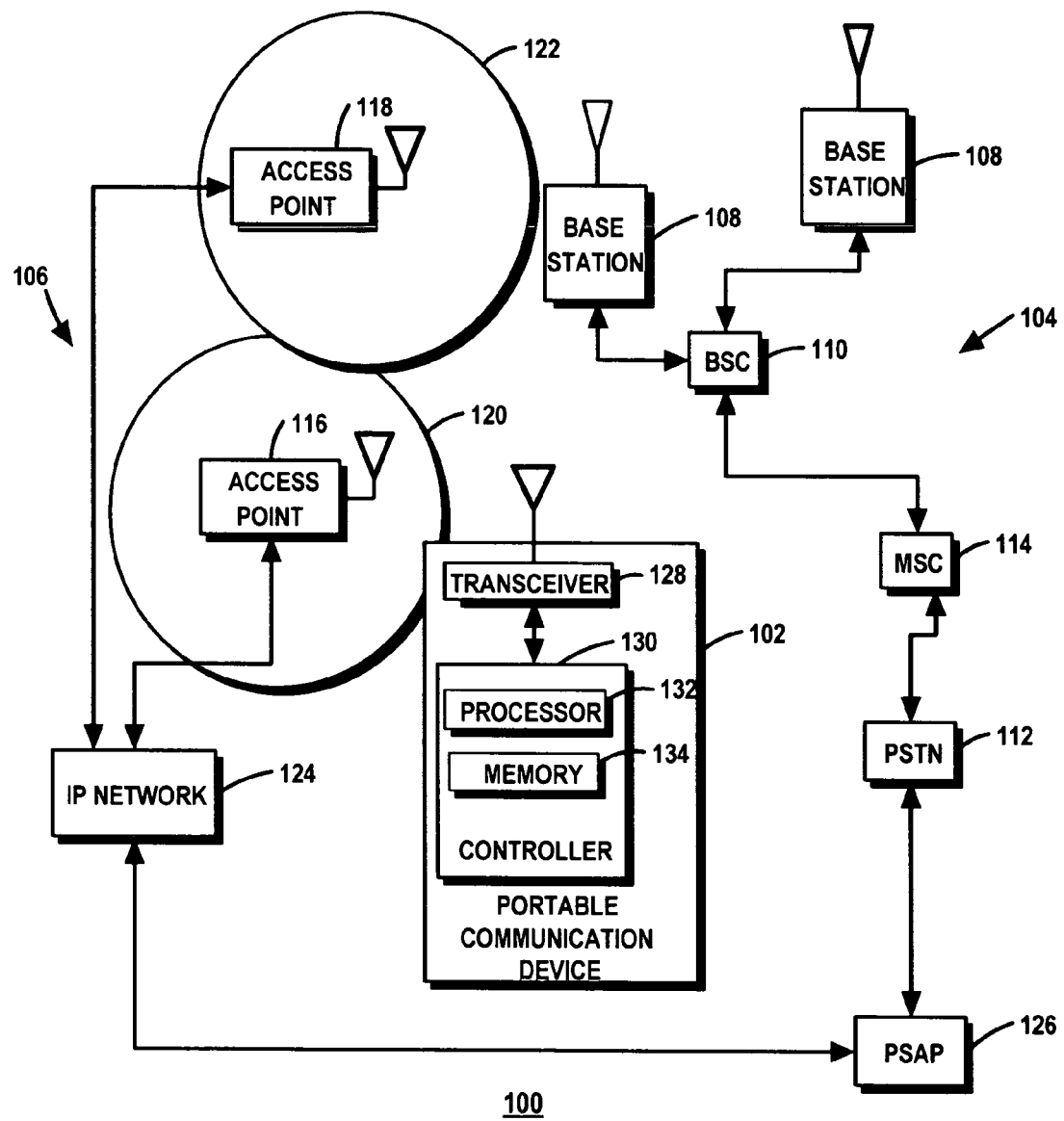
FIG. 1 is a block diagram of a portable communication device within a multiple service wireless communication system.

FIG. 1 is a block diagram of communication network 100 in accordance with the exemplary embodiment of the invention. A portable communication device 102 can communicate with at least two communication networks within the communication network 100 which includes at least a cellular telecommunication system (cellular system) 104 and a WLAN system 106 in the exemplary embodiment. The cellular system 104 provides cellular communication services through an arrangement of base stations 108 connected to a base station controller 110. The base station controller 110 is connected to a public switched telephone network (PSTN) 112 through a mobile switching center (MSC) 114. In the exemplary embodiment, the cellular telecommunications system 104 operates in accordance Code Division Multiple Access (CDMA) standards such as cdma2000 1X, 1xEV-DO, and W-CDMA. In some circumstances, the cellular system 104 may operate with other standards such as OFDM based standards or GSM standards, for example. The various functions and operations of the blocks described with reference to the cellular system 104 may be implemented in any number of devices, circuits, or elements. Two or more of the functional blocks may be integrated in a single device and the functions described as performed in any single device may be implemented over several devices. For example, at least portions of the functions of the BSC 110 may be performed by the base stations 108 or the MSC 114 in some circumstances.

The WLAN system 106 provides communication services through an arrangement of access points 116, 118 connected to an internet protocol (IP) network 124. The transceivers 116, 118 form geographical coverage areas 120, 122 where the portable communication device 102 can access and utilize the communication services. Although the geographical coverage areas 120, 122 are circular in FIG. 1, the geographical coverage areas 120, 122 may have any of numerous sizes and shapes. In the exemplary embodiment, the WLAN system 106 is a WLAN operating in accordance with IEEE 802.11 standards. Voice signals are exchanged between the portable communication device 102 and another party (not shown) through the IP network 124 using VoIP techniques. The IP network 124 includes hardware, software, and firmware for supporting VoIP communications where at least portions of the IP network 124 may be connected to the PSTN 112 in some circumstances.

The portable communication device 102 may be a cellular telephone, wireless modem, personal digital assistant (PDA) or other device that exchanges electromagnetic signals with a fixed or portable communication device. In the exemplary embodiment, the portable communication device 102 includes other hardware, software, and firmware not shown in FIG. 1 for facilitating and performing the functions of a portable communication device 102. For example, the portable communication device 102 includes input and output devices such as keypads, displays, microphones and speakers. Further, the functions and operations of the blocks of the portable communication device 102 may be implemented in any number of devices, circuits, or elements. Two or more of the functional blocks may be integrated in a single device and the functions described as performed in any single device may be implemented over several devices. For example, portions of the controller 130 may perform some of the functions of the transceiver 128 in some circumstances.

The transceiver 128 includes any combination of hardware, software and/or firmware for performing the functions of a transmitter(s) and receiver(s) that are capable of exchanging electromagnetic signals with the access points 116, 118 and the base stations 108. The transceiver 128, therefore, includes radio frequency circuitry for operating in at least the frequency bands of the WLAN system 106 and the cellular system 104. In some circumstances, the transceiver 128 may be capable of operating within other communication systems.

The controller 130 is any device, circuit, integrated circuit (IC), application specific IC (ASIC), or other configuration including any combination of hardware, software and/or firmware that performs the functions described herein as well as facilitating the overall functionality of the portable communication device 102. In the exemplary embodiment, the controller 130 includes a processor 132 and a memory 134. The processor 132 is any computer, processor, microprocessor, or processor arrangement that executes software code to perform the calculation and control functions described herein. The memory 134 is any memory device, IC, or memory medium suitable for storing code and data that can be accessed by the processor 132. The controller 130 may include other devices, circuits and elements not shown in FIG. 1 that facilitate the exchange of signals and perform other interface functions.

As explained above, the portable communication device 102 is capable of operating in the cellular telecommunication system 104 and in the WLAN system 106. While communicating in one of the systems 104, 106, the portable communication device 102 may be manually switched to the other system (104, 106) by the user. Further, the portable communication device 102 may be programmed to automatically switch from one system to the other when certain conditions are met without user intervention. The transceiver 128 and controller 130, therefore, include the hardware, software, and firmware for maintaining communication services on both of the systems 104, 106.

The decision to switch from one system to the other may be based on any number of factors such as availability, quality of service, supported applications (such as VoIP) and cost of service. In a typical scenario, the portable communication device 102 detects a WLAN system 106 while registered on the cellular system 104. If the quality of the WLAN service is adequate, the portable communication device switches to the WLAN system 106. As explained above, geographical location determination information may not be available when the portable communication device 102 is operating within the WLAN system 106. As explained below in further detail, the portable communication device 102 performs a location determination procedure when the WLAN system 106 is detected. If the portable communication device 102 detects the alternate communication system, location data related to geographical location information is obtained using GPS, Assisted GPS (AGPS) or AFLT procedures before switching to the WLAN system 106. In some situations, the portable communication device 102 may detect the alternate communication system, perform the location determination procedure, but not switch to the alternate communication system. The received location data allows the portable communication device, infrastructure, or a combination of both to determine the geographical location of the portable communication device 102. As discussed herein, the data received at the portable communication device is referred to as the location data and the information stored at the portable communication device 102 is referred to as geographical location information. The location data includes measurements performed by the portable communication device 102 such as code phase measurement to obtain pseudorange values as well as GPS system parameters that allow the portable communication device to take measurements and calculate location values. Examples of GPS system parameters include ephemeris data and almanac data. In assisted location determination procedures, the cellular network transmits assistance data such as Doppler and code phase information and time estimates. Additional details regarding the GPS assistance for CDMA is provided in the TIA-801-1 or TIA-801-A specifications.

Based on the location data, the portable communication device determines the geographical location information. The geographical location information is any information that allows a network entity, public safety answering point PSAP, or other infrastructure to determine the geographical location of the portable communication device 102. Depending on the particular location determination technique, the geographical location information may be the raw data received at the portable communication device, partially processed data that allows a network entity to calculate the device location, or complete location information that does not require further processing such as latitude and longitude values. For example, the location data and the geographical location information may be same values where the location data includes pseudorange values and the pseudorange values are transmitted to a position determination entity (PDE) that convert the pseudorange values into latitude and longitude values. Depending on the particular implementation, the geographical location information may be based on data received from one or several sources and may be calculated based on received data as well as stored data. The geographical location information is stored in memory 134 and retrieved if necessary for forwarding to a public safety answering point (PSAP) 126. In some circumstances, the geographical location information is forwarded to a network entity such as a position determination entity (PDE) or VoIP gateway (not shown) before the information is forwarded to the PSAP 126. For example, if the portable communication device 102 employs assisted GPS and the geographical location information is GPS pseudorange information, a network entity calculates the geographical location of the portable communication device 102 and provides the location information in an appropriate format to the PSAP 126. Therefore, the stored geographical location information includes pseudorange measurements or latitude and longitude values where stand-alone GPS systems are utilized. In some circumstances, however, raw location data or other information associated with the geographical location of the portable communication device may be stored and/or transmitted.

If the portable communication device is operating in a WLAN coverage area 120 and another WLAN coverage area 122 is detected, the portable communication device 102 attempts to obtain location data. In the exemplary embodiment, the portable communication device 102 acquires a cellular telecommunication system channel and performs the location determination procedure. The intersection of WLAN coverage areas often occurs where cellular service is available. For example, adjacent buildings in a campus may each have a WLAN. When the user moves to an adjacent building, access to GPS and the cellular telecommunication system is likely since the user is outdoors or in a corridor with minimal obstruction to base station coverage. Updating the location information also allows the portable communication device 102 to store the most up-to-date geographical location information, but not so often as to increase the power consumption of the portable communication device 102 when the portable communication device 102 stays in the same coverage area. Updating location information during handoffs between Access Points belonging to different coverage areas allows for optimum tradeoffs between power consumption and location accuracy. In some circumstances, multiple location information belonging to different Access Points can be stored so that the geographical location information does not need to be updated if the portable communication device 102 transitions back to one of the previous WLAN coverage areas.

When the portable communication device 102 is operating within the WLAN system 106 and an emergency call is initiated at the portable communication device 102, an emergency call procedure is performed. As described in further detail below, the emergency call procedure may include transmitting the geographical location information from the portable communication device 102 through the cellular system 104 or through the WLAN system 106 using a VoIP service.

Figure 2:
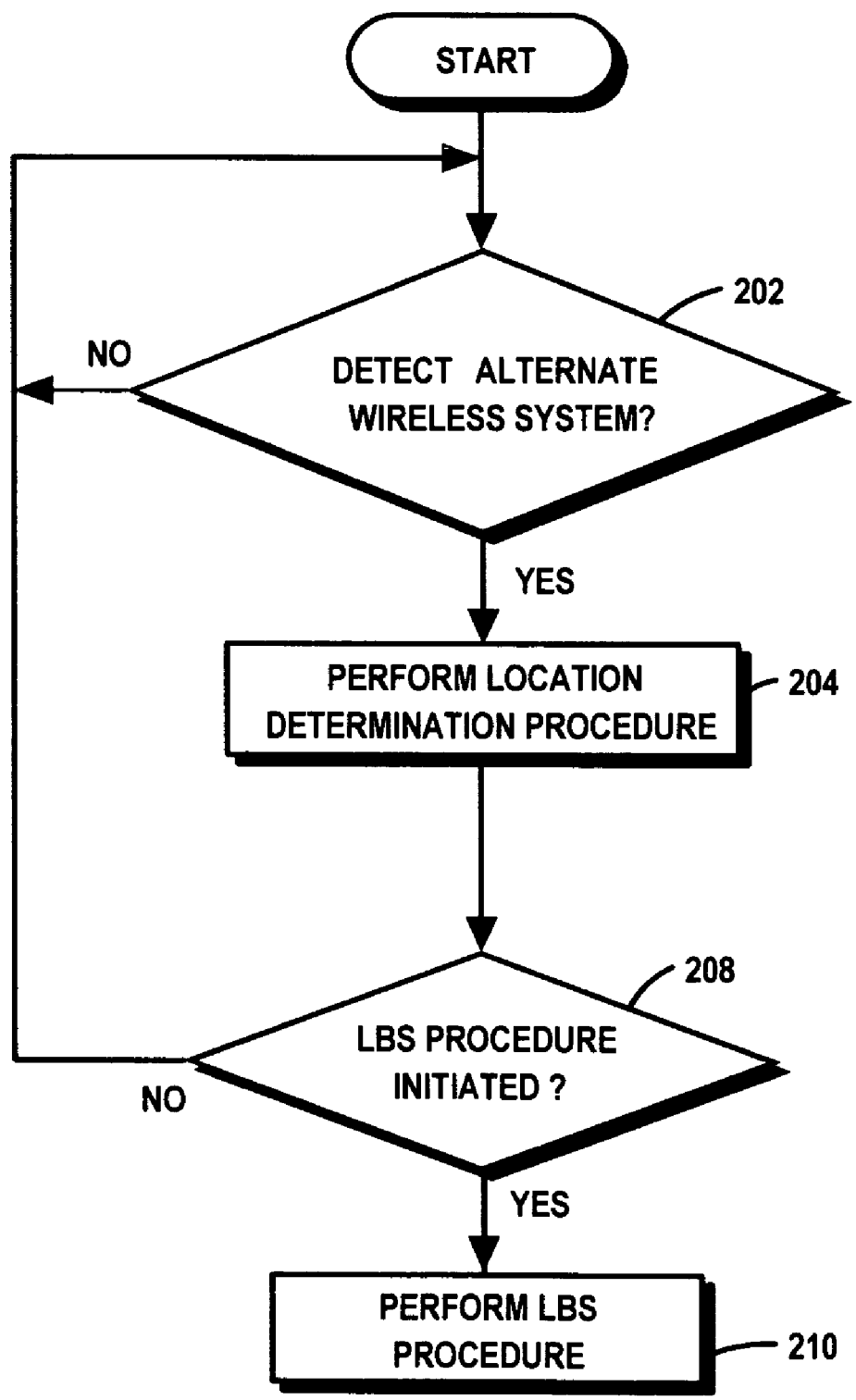
FIG. 2 is a flow chart of a method of location management in accordance with the exemplary embodiment of the invention.

FIG. 2 is a flow chart of a method of managing geographical location information at portable communication device 102 in accordance with the exemplary embodiment of the invention. The method can be executed using any combination of hardware, software and/or firmware. In the exemplary embodiment, the method is performed in the portable communication device 102 by executing code on the controller 130.

At step 202, it is determined whether an alternate wireless system is available. In the exemplary embodiment, the controller 130 determines whether an access point 118 within WLAN coverage area 122 is available. The access point 118 may be detected when the portable communication device 102 is operating within the cellular system 104 or within the WLAN system 106. Where the portable communication device is currently operating within a WLAN coverage area 120, the alternate wireless system is another access point 118 that may or may not be part of a single WLAN network. In the exemplary embodiment, the controller does not determine that an alternate communication system has been detected when a cellular system is detected. If an alternate wireless system is detected, the method continues to step 204. Otherwise, the method returns to step 202 to continue monitoring for alternate systems such as a WLAN.

At step 204, a location determination procedure is performed. The location determination procedure may employ any of several techniques or combination of techniques to acquire location data and determine geographical location information. The techniques may include satellite techniques such as Global Positioning Satellite (GPS) or Assisted GPS (AGPS) techniques, techniques that utilize the cellular telecommunication system such as Advanced Forward Link Trilateration (AFLT) or any combination thereof. Examples of other suitable techniques include hybrid mode and Observed Time Delay and ETOA. In the exemplary embodiment, assisted GPS (AGPS) techniques are utilized to acquire location data. In some systems, assistance data provided by the communication network allows the portable communication device 102 acquire location data such as pseudorange values derived from measured code phase. Although in some situations the raw data may be stored, the portable communication device 102 processes the location data to generate and store geographical location information in the exemplary embodiment. The geographical location information including the pseudorange values is stored in memory and transmitted to a PDE during a 9-1-1 call. The PDE calculates the latitude and longitude values and forwards the values to the PSAP 126. As discussed above, the geographical location information provides information that allows the PSAP 126 or a network entity to determine the geographical location of the portable communication device 102. Where the geographical location information includes processed data such as latitude and longitude values, the geographical location information may be transmitted directly to the PSAP 126. The geographical location information is sent to the PDE for further processing before being forwarded to the PSAP 126 in situations where the geographical location information includes partially processed or raw location data. For example, if the geographical location information data comprises pseudorange values, a PDE processes the information to generate latitude and longitude values to send to the PSAP 126. Accordingly, if the location determination procedure utilizes AGPS techniques, the portable communication device receives assistance data from the communication network and measures and calculates pseudorange values.

At step 208, it is determined if location based service (LBS) procedure such as 911 call will be performed. If a LBS procedure is initiated, the method continues at step 210. Otherwise the method returns to step 202.

At step 210, a LBS procedure is performed. As discussed with reference to FIG. 3, the LBS procedure may utilize the WLAN system in some circumstances. An emergency call for example may be placed through the WLAN system 106. In other situations, the cellular system 104 may be used for the LBS procedure as discussed with reference to FIG. 4 and FIG. 5. An emergency call, for example, may be placed through the cellular system 104. The LBS procedure uses the geographical location information. After a 911 call is placed, for example, appropriate geographical location information is sent to the PSAP 126 directly or through a network entity such as a VoIP gateway or PDE. The information may be stored information, newly acquired information, or a combination of both. In the exemplary embodiment, a figure of merit is applied to determine which geographical location information should be used. In some situations, quality data such as parameters indicating the age of the data, number of boundary crossings, dilution of precision (DOP) (this could also be GDOP which is Geometric DOP), RMS errors may be sent to the PDE or PSAP 126 allowing the PDE an entity in the network 100 to determine which geographical location information is most reliable.

Figure 3:
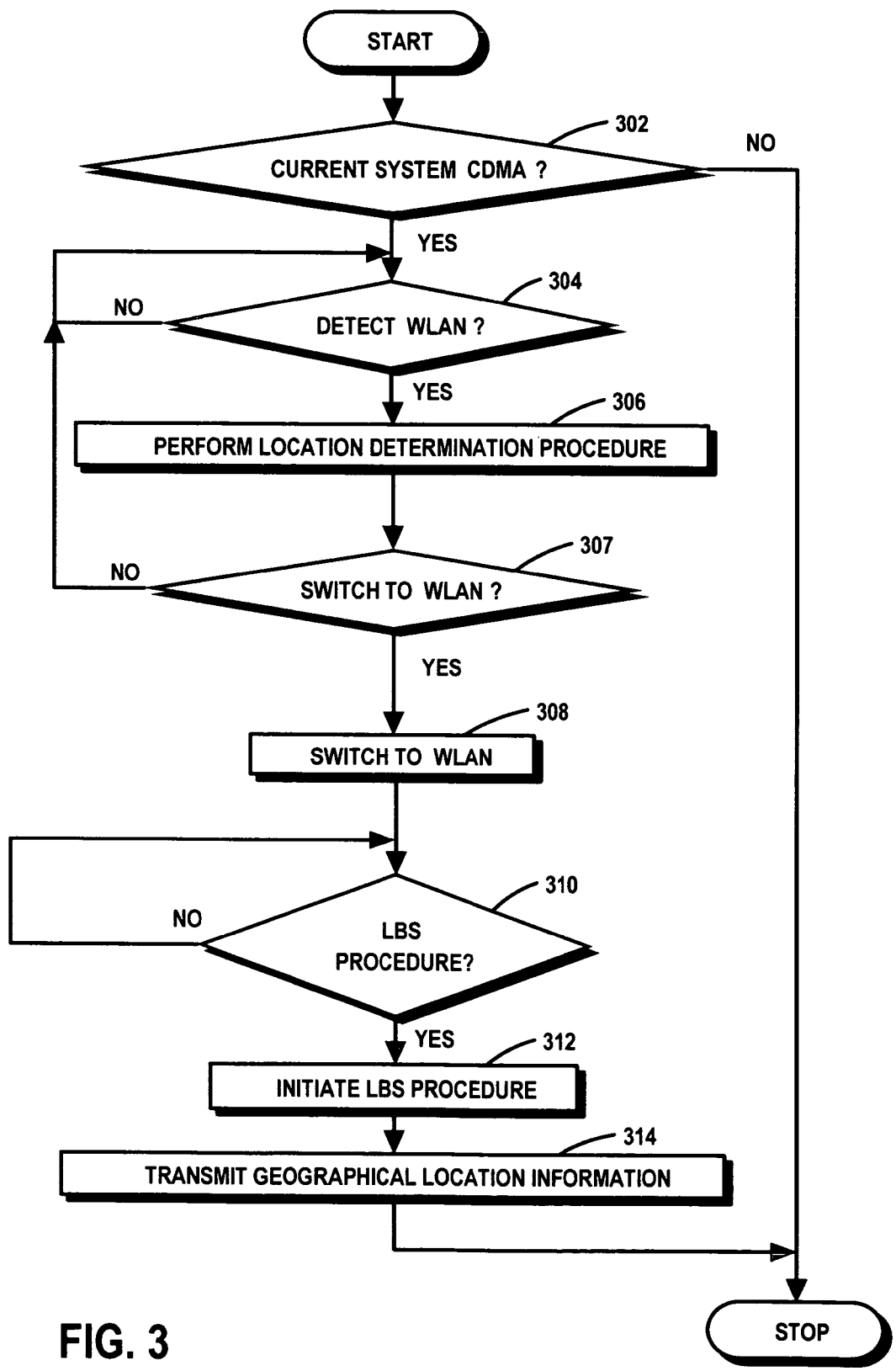
FIG. 3 is a flow chart of a method of managing geographical location information at the portable communication device where the geographical location information is transmitted through the VoIP system during a location based service (LBS) procedure.

FIG. 3 is a flow chart of a method of managing geographical location information at the portable communication device where the geographical location information is transmitted through the WLAN system 106 during a LBS procedure such as an emergency call. The method discussed with reference to FIG. 3 is an exemplary implementation of the method discussed with reference to FIG. 2. The portable communication device 102 executes the method of FIG. 3 to manage location information when switching between the cellular system 104 and a WLAN system 106.

At step 302, it is determined whether the portable communication device 102 is registered to the cellular system 104. In the exemplary embodiment, the controller 130 determines if the portable communication device 102 is communicating within a CDMA system. If the current system is a CDMA system, the method continues to step 304. Otherwise, the method stops.

At step 304, it is determined whether the portable communication device 102 has detected a WLAN system 106. The controller 130 determines if the conditions for switching to the WLAN coverage area 122 have been met. In the exemplary embodiment, the controller 130 determines if the signal strength in a WLAN coverage area 122 is adequate to switch to the WLAN system 106. Other conditions may be considered in some circumstances. For example, a carrier to noise ratio may be evaluated to determine if service is adequate for communication. In other situations, a detection of a carrier signal within the WLAN spectrum may be adequate to determine that an access point 118 has been detected. If an access point 118 is detected, the procedure continues at step 306. Otherwise, the procedure returns to step 302 to continue monitoring for an alternate wireless system.

At step 306, a location determination procedure is performed. In the exemplary embodiment, a GPS, AGPS, AFLT or other network based location determination technique is used to obtain location data. As discussed above, the location data may include data that allows the portable communication device to determine the location or it may include data that can be used by a network entity to determine the geographical location of the portable communication device. The location data may be processed to generate the geographical location information that is stored in the memory 134 of the portable communication device 102.

At step 307, it is determined whether the portable communication device 102 will switch to the WLAN system. In the exemplary embodiment, the controller determines whether the user has indicated that service should be switched to the WLAN system 106. Other criteria may be used to determine if the portable communication device 102 will switch to the WLAN system 102. For example, the portable communication device 102 may be configured to switch to the WLAN system automatically when adequate WLAN signal is detected. If, however, the portable communication device is not configured to automatically switch, the controller 130 determines that the service will be switched when the user indicates that a switch should be made. If it is determined that the portable communication device 102 will switch to the WLAN system 106, the method continues at step 308. Otherwise, the method returns to step 304 to continue monitoring for a detection of a WLAN system 106.

At step 308, the portable communication device 102 is switched to the WLAN system 106. In the exemplary embodiment, the appropriate signals are transmitted in accordance with the protocols of the WLAN system 106 to establish communication on the WLAN system 106.

At step 310, it is determined whether a LBS procedure has been invoked. For example, the portable communication device determines if an emergency call has been placed. If a LBS procedure has been invoked, the method continues at step 312. Otherwise, the method returns to step 310 to continue monitoring for an emergency call.

At step 312, a LBS procedure is performed. For example if a user dials "9-1-1", the controller 130 determines that the user has indicated that an emergency call should be placed. Other techniques for initiate a LBS call may be used in some situations. For example, voice dialing or voice activation techniques may initiate a 9-1-1 call in some situations.

At step 314, the geographical location information is transmitted through the WLAN system 106 to a PSAP 126. If the geographical location information requires further processing to determine the geographical location of the portable communication device 102, the geographical location information is sent to a network entity such as a position determination entity (PDE) or VoIP gateway which forwards the geographical location of the portable communication device to the PSAP 126.

Figure 4:
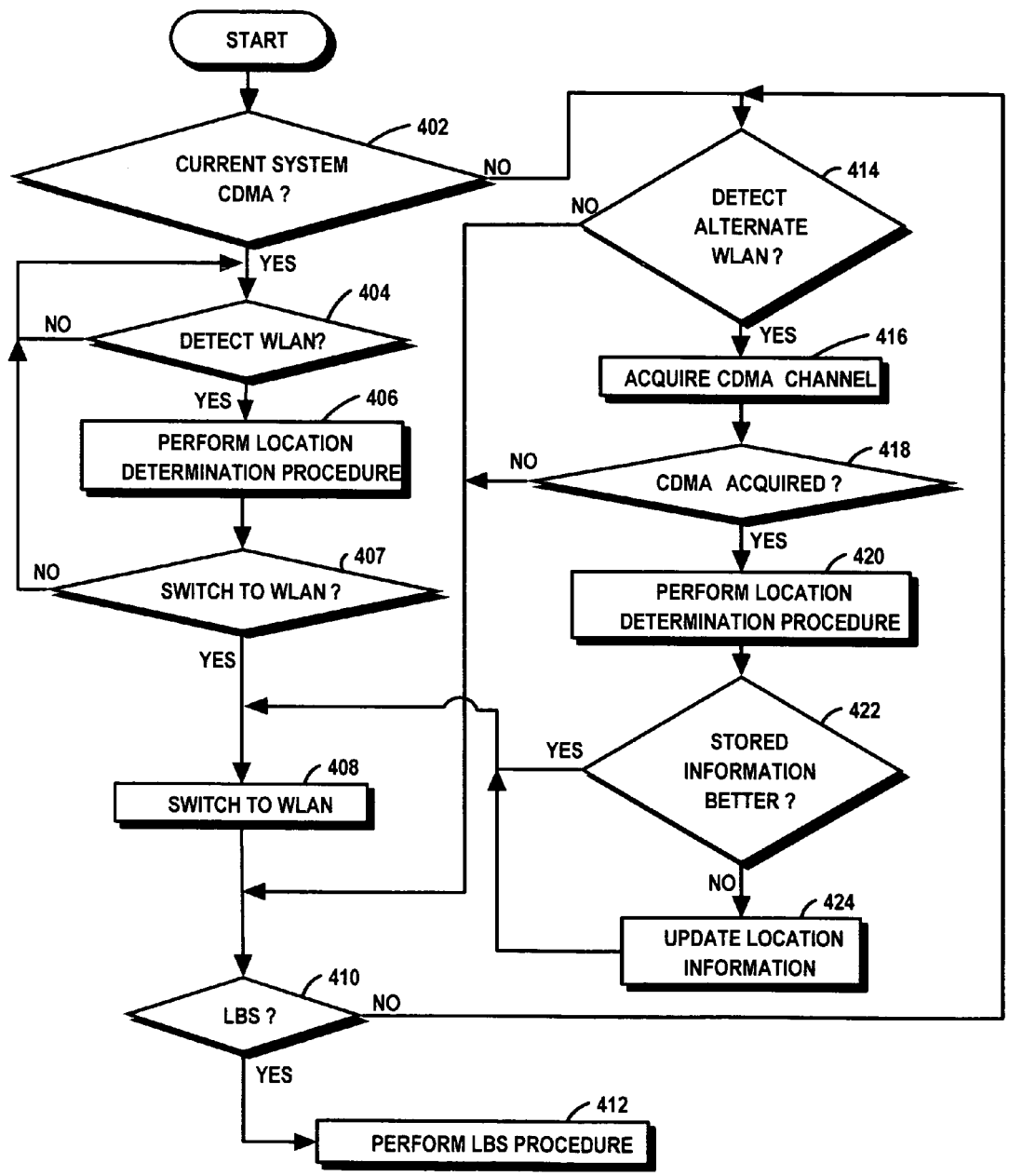
FIG. 4 is a flow chart of a method of managing geographical location information in accordance with the exemplary embodiment of the invention where the geographical location information is transmitted through the cellular telecommunications system during a location based service (LBS) procedure.

FIG. 4 is a flow chart of a method of managing geographical location information in accordance with the exemplary embodiment of the invention where the geographical location information is transmitted through the cellular system 104 during an emergency call.

At step 402, it is determined whether the current communication system is a CDMA cellular system. If the current system is a CDMA cellular system, the method continues at step 404. Otherwise, the method proceeds to step 414.

At step 404, it is determined whether the portable communication device 102 has detected a WLAN system 106. If the portable communication device 102 has detected a WLAN system 106, the method continues at step 406. Otherwise, the method returns to step 404 to continue detecting for a WLAN system 106.

At step 406, the location determination procedure is performed. Using GPS, AGPS, AFLT, or some other technique, location data is received at the portable communication device 102.

At step 407, it is determined whether the portable communication device 102 will switch to a WLAN system 106. If the portable communication device 102 will switch to the WLAN system 106, the method continues at step 408. Otherwise, the method returns to step 404 to continue monitoring for a detection of an alternate communication system.

At step 408, the portable communication device is switched to the WLAN system 106.

At step 410, it is determined if an emergency call has been initiated. If an emergency call has been initiated, the emergency call procedure is performed at step 412. An exemplary call procedure is discussed in further detail below with reference to FIG. 5. If an emergency call is not initiated, the procedure proceeds to step 414.

At step 414, it is determined whether the portable communication device 102 will engage in a handoff procedure. In the exemplary embodiment, the controller 130 determines if the conditions have been met to transfer communications from the current access point 118 to another access point 116. If the portable communication device 102 is not engaged in a handoff, the method returns to step 410 in order to continue monitoring for an emergency call. If communications will be transferred from one access point 116 to another 118, the method continues at step 416.

At step 416, the portable communication device attempts to acquire a cellular telecommunication system channel. In the exemplary embodiment, the controller 130 executes a CDMA channel acquisition procedure. Although in the exemplary embodiment, the portable communication device 102 registers on the CDMA network, registration may not be required in some circumstances. Registration methods are typically specified by the service provider. An example of suitable registration method includes a timer-based registration where the portable communication device 102 registers every x seconds, where x is operator specified. Further, registration is not required in situations where the portable communication device 102 employs autonomous GPS where network assistance is not required. In some circumstances, the portable communication device 102 may remain registered on the CDMA system when the WLAN system is used and, therefore, may not need to perform a registration procedure at step 416.

At step 418, it is determined whether a cellular telecommunications system channel has been acquired. If a channel has been acquired, the method continues at step 420. Otherwise, the method returns to step 410.

At step 420, the portable communication device performs a location determination procedure. In the exemplary embodiment, AGPS techniques are used to receive updated location data that includes code phase to determine pseudorange information. Other techniques may be used in some circumstances such as, for example, GPS and AFLT.

At step 422, it is determined whether the previously stored geographical location information is better than the updated geographical location. In the exemplary embodiment a figure of merit is applied to the updated geographical location information to determine to compare the reliability and accuracy of the updated geographical location information. Examples of suitable techniques of determining reliability and accuracy of the geographical location information includes techniques based on the age of the data, carrier-to-noise (C/N) ratio of signals transmitted by the space vehicles (SVs), RMS estimate of the horizontal position, RMS estimate of the vertical position, relative satellite code phase error, absolute satellite code phase error, Doppler error, and location uncertainty (angle, vertical, angle). The various parameters are discussed in Telecommunications Industry Association (TIA) published telecommunication standards and TIA-801-1 (Position Determination) and TIA-801-A. ("Position Determination Service for cdma2000® Spread Spectrum Systems"). In addition SV geometry such as Geometric Dilution of Precision (GDOP), Position Dilution of Precision (PDOP), Vertical Dilution of Precision (VDOP) and Horizontal Dilution of Precision (HDOP) can be used. If the previously stored geographical information is less reliable than the new geographical location information, the method continues at step 424. Otherwise, the method continues at step 408 where the portable communication device reestablishes communications with the WLAN system before returning to step 410. At step 108, the portable communication device 102 may return to communicate with the access point 116 or may switch to the new access point 118. Where the portable communication device 102 is capable of maintaining simultaneous cellular and WLAN communications, the portable either continues communicating on the original access point 116 or switches to the alternate access point 118.

At step 424, the stored geographical location is updated. In the exemplary embodiment, the appropriate data stored in memory 134 is replaced with the newly acquired data to store the most recently acquired geographical location information at the portable communication device. After storing the new information the method continues at step 408.

Therefore, where the portable communication device 102 does not support simultaneous cellular and WLAN communications, the portable communication device 102 temporarily switches to the cellular telecommunication system before engaging in a handoff from one access point 116 to another access point 118. Since WLAN coverage areas have relatively small geographical areas, the geographical location information obtained prior to connecting to the WLAN system is considered adequate for emergency calls while the portable is within a single VoIP coverage area. When a WLAN handoff will be performed or the portable communication device 102 otherwise switches to another WLAN coverage area 122, the location of the portable communication device 102 will likely change such that the most recent location information may become less reliable. In addition, boundaries between WLAN coverage areas are likely to occur where the cellular telecommunications system is available. Accordingly, the stored geographical location information is updated before a WLAN handoff or WLAN coverage area 122 change.

Figure 5:
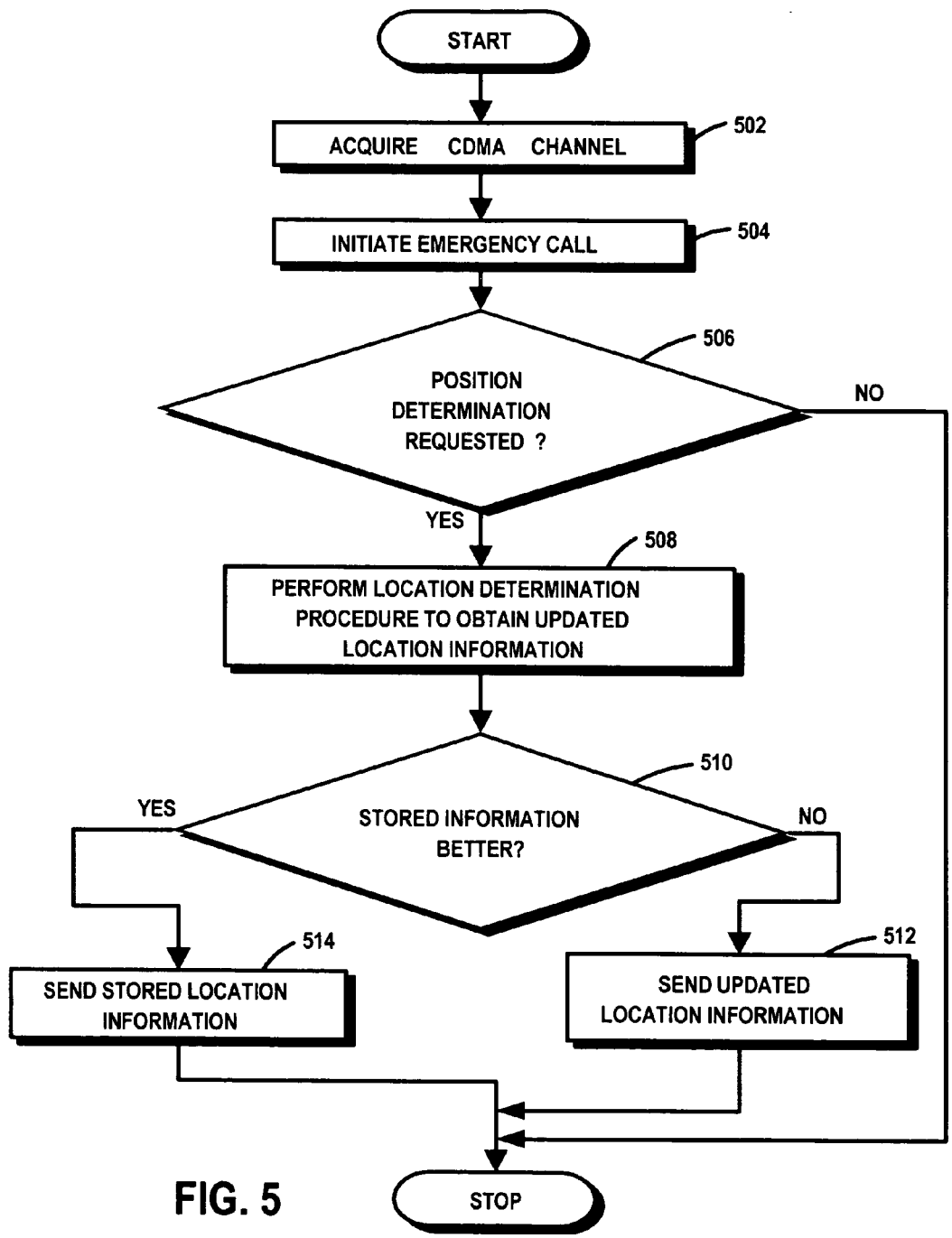
FIG. 5 is a flow chart of a method of performing an emergency call procedure in accordance with the exemplary embodiment where the geographical location information is transmitted through the cellular telecommunication system.

FIG. 5 is a flow chart of a method of performing a LBS procedure where the LBS procedure is an emergency call procedure in accordance with the exemplary embodiment. In the method described with reference to FIG. 5, the geographical location information is transmitted through the cellular telecommunication system. Accordingly, the procedure discussed with reference to FIG. 5 provides an exemplary method for performing step 412 of FIG. 4.

At step 502, a cellular telecommunication channel is acquired. In the exemplary embodiment, the controller 130 retrieves the preferred roaming list (PRL) stored in memory 134 and the portable communication device transmits the appropriate signals to establish communication with an available cellular communication system 104 to acquire a CDMA channel.

At step 504, an emergency call is initiated through the cellular system 106. In the exemplary embodiment, the appropriate signals are transmitted to the base station 108 in accordance with standard techniques of the cellular system 104 to initiate the emergency call.

At step 506, it is determined if position determination has been requested. In the exemplary embodiment, the controller 130 determines if the base station 108 has transmitted a request for geographical location information. If a request has been made, the method continues at step 508. Otherwise, the method stops. If the geographical location information is not requested, then the PSAP in that region likely does not support location service automatically. The geographical location information is still useful in situations where the user can tell the PSAP operator his location using displayed geographical location information on the device while engaged in phone conversation with the PSAP operator.

At step 508, a location determination procedure is performed. In the exemplary embodiment AGPS techniques are utilized to obtain location data. The new location data is used to determine the new geographical location information.

At step 510, it is determined whether the stored geographical location information is better than the new geographical location information. In the exemplary embodiment, a figure of merit is applied to compare the information. If the stored information is better, the method continues at step 514. Otherwise, the method proceeds to step 512.

At step 514, the stored geographical location information is transmitted through the cellular telecommunication system. In the exemplary embodiment, the location information is transmitted to the PDE in the CDMA network. As described above, the PDE processed geographical location information is forwarded to PSAP 126 in accordance to known and future implemented techniques. Exemplary call flows are discussed in detail in the J-STD-036 standard.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method for location information management performed in a portable communication device, the method comprising:
when communicating with a first wireless local area network ("WLAN") access point associated with a first WLAN system and while registered on a cellular communication system, determining geographic location information of a portable communication device in response to detecting a second WLAN access point associated with a second WLAN system;
storing the geographic location information at the portable communication device; and
transmitting the geographic location information to a public safety answering point (PSAP) while communicating on the second WLAN system.

2. The method of claim 1, further comprising: transmitting the geographic location information through the second WLAN system to a public safety answering point (PSAP).

3. The method of claim 2, wherein the transmitting comprises: transmitting the geographic location information to the public safety answering point (PSAP) through a position determination entity.

4. The method of claim 1, further comprising: transmitting the geographic location information through the cellular communication system to a public safety answering point (PSAP).

5. The method of claim 4, wherein the transmitting comprises: transmitting the geographic location information to the public safety answering point (PSAP) through a position determination entity.

6. The method of claim 1, wherein the determining comprises: detecting the second WLAN system while communicating through the cellular communication system.

7. The method of claim 1, wherein the determining further comprises: determining the geographic location information based on location data received from a global positioning satellite (GPS) system.

8. The method of claim 7, wherein the determining further comprises: determining the geographic location information from location data received from the cellular communication system.

9. The method of claim 1, wherein the storing comprises: storing geographic location information corresponding to a plurality of locations associated with a plurality of WLAN coverage areas.

10. A portable communication device comprising:
a transceiver configured to receive signals and to exchange signals with a cellular communication system;
a controller configured to determine geographic location information in response to detecting a second wireless local area network ("WLAN") access point associated with a second WLAN system while the portable communication device is registered on the cellular communication system and while the portable communication device is communicating with a first WLAN access point associated with a first WLAN system; and
a memory configured to store the geographic location information at the portable communication device, the transceiver further configured to transmit the geographic location information to a public safety answering point (PSAP) while communicating on the second WLAN system.

11. The portable communication device of claim 10, wherein the controller is further configured to detect the second WLAN system while the portable communication device is communicating through the cellular communication system.

12. The portable communication device of claim 10, wherein the transceiver is further configured to transmit the geographic location information through the second WLAN system to an emergency public safety answering point (PSAP).

13. The portable communication device of claim 10, wherein the transceiver is further configured to transmit the geographic location information through the cellular communication system.

14. The portable communication device of claim 11, wherein the controller is further configured to determine the geographic location information based on location data received from a global positioning satellite (GPS) system.

15. A dual mode portable communication device comprising:

detecting means for detecting a second wireless local area network (WLAN) system while communicating within a first WLAN and while registered on a cellular communication system;

location determination means for determining, in response to the detecting, geographic location information based on location data received at the portable communication device;

storing means for storing the geographic location information; and transmitting means for transmitting the geographic location information to a public safety answering point (PSAP) while communicating on the second WLAN system after an emergency call is initiated from the portable communication device.

\* \* \* \* \*